US009412101B1

(12) United States Patent
Blank et al.

(10) Patent No.: US 9,412,101 B1
(45) Date of Patent: Aug. 9, 2016

(54) SYSTEMS METHODS AND COMPUTER PROGRAM PRODUCTS FOR DIRECTING CONSUMER FROM DIGITAL RECEIPT TO SOURCE OF SPECIFIC ITEM FOR REPEAT ITEM PURCHASE

(71) Applicant: Intuit Inc., Mountain View, CA (US)

(72) Inventors: Bennett R. Blank, San Diego, CA (US); Jonathan A. Lieberman, San Francisco, CA (US)

(73) Assignee: INTUIT INC., Mountain View, CA (US)

( * ) Notice: Subject to any disclaimer, the term of this patent is extended or adjusted under 35 U.S.C. 154(b) by 524 days.

(21) Appl. No.: 14/015,936

(22) Filed: Aug. 30, 2013

Related U.S. Application Data

(63) Continuation of application No. 13/014,554, filed on Jan. 26, 2011, now Pat. No. 8,527,367.

(51) Int. Cl.
*G06Q 30/00* (2012.01)
*G06Q 20/20* (2012.01)
*G06Q 30/06* (2012.01)

(52) U.S. Cl.
CPC .......... *G06Q 20/209* (2013.01); *G06Q 30/0633* (2013.01); *G06Q 30/0635* (2013.01); *G06Q 30/0623* (2013.01)

(58) Field of Classification Search
CPC .......... G06Q 30/0623; G06Q 30/0633; G06Q 30/0635; G06Q 30/0639; G06Q 30/0641
USPC ................ 705/26.61, 26.8, 26.81, 26.9, 27.1
See application file for complete search history.

(56) References Cited

U.S. PATENT DOCUMENTS

| | | |
|---|---|---|
| 6,029,141 A | 2/2000 | Bezos et al. |
| 6,430,541 B1 | 8/2002 | Brown et al. |
| 6,487,540 B1 | 11/2002 | Smith et al. |
| 6,738,749 B1 | 5/2004 | Chasko |
| 7,455,226 B1 | 11/2008 | Hammond et al. |
| 7,552,087 B2 | 6/2009 | Schultz et al. |
| 7,555,476 B2 | 6/2009 | Holbrook |
| 7,676,396 B1 | 3/2010 | White |
| 7,774,234 B1 * | 8/2010 | Kopelman ............. G06Q 30/06 705/26.1 |
| 7,792,709 B1 | 9/2010 | Trandal et al. |
| 7,987,120 B2 | 7/2011 | Shiftan et al. |
| 8,170,921 B2 | 5/2012 | Stocker |

(Continued)

OTHER PUBLICATIONS

Anon., "Symcor Enables the Bay and Zellers to Deliver Their Customer Credit Card," PR Newswire, Oct. 24, 2001.*

(Continued)

*Primary Examiner* — Nicholas D Rosen
(74) *Attorney, Agent, or Firm* — Vista IP Law Group LLP

(57) ABSTRACT

Systems, computer-implemented methods and computer program products for directing a consumer to a source offering for sale a specific item previously purchased by the consumer. Electronic receipt data generated for a consumer purchase of a specifically identified item is generated by a merchant transaction processing device, and an electronic representation of a receipt is generated based on that data. The electronic representation identifies the specific item and includes an input element or button that can be selected, clicked on, executed or activated by a consumer to allow the consumer to be directed to a website of a merchant who offers the same item for sale and from which the consumer can buy the same item again.

20 Claims, 18 Drawing Sheets

(56) References Cited

U.S. PATENT DOCUMENTS

| | | | |
|---|---|---|---|
| 8,392,288 B1 | 3/2013 | Miller | |
| 8,527,367 B2 * | 9/2013 | Blank | G06Q 30/0633 705/26.8 |
| 8,620,576 B1 * | 12/2013 | Papadopolo | G01C 21/3605 701/410 |
| 2001/0027423 A1 | 10/2001 | Clonts et al. | |
| 2001/0029483 A1 | 10/2001 | Schultz et al. | |
| 2001/0037207 A1 | 11/2001 | Dejaeger | |
| 2002/0138354 A1 | 9/2002 | Seal et al. | |
| 2003/0020762 A1 | 1/2003 | Budrys et al. | |
| 2003/0055733 A1 | 3/2003 | Marshall et al. | |
| 2003/0126020 A1 | 7/2003 | Smith et al. | |
| 2004/0019531 A1 * | 1/2004 | Broussard | G06Q 30/0611 705/26.4 |
| 2004/0220964 A1 | 11/2004 | Shiftan et al. | |
| 2004/0225567 A1 | 11/2004 | Mitchell et al. | |
| 2005/0049928 A1 * | 3/2005 | Naick | G06Q 40/12 705/30 |
| 2005/0049958 A1 | 3/2005 | Macolino | |
| 2006/0038003 A1 | 2/2006 | Wakasa et al. | |
| 2006/0273163 A1 | 12/2006 | Gusler et al. | |
| 2007/0069013 A1 | 3/2007 | Seifert et al. | |
| 2007/0094087 A1 | 4/2007 | Mitchell et al. | |
| 2007/0164106 A1 | 7/2007 | McDevitt et al. | |
| 2007/0288322 A1 | 12/2007 | Watanabe | |
| 2008/0208762 A1 | 8/2008 | Arthur et al. | |
| 2008/0235749 A1 | 9/2008 | Jain et al. | |
| 2009/0210444 A1 | 8/2009 | Bailey et al. | |
| 2009/0271265 A1 | 10/2009 | Lay et al. | |
| 2010/0153242 A1 | 6/2010 | Preston et al. | |
| 2011/0125598 A1 | 5/2011 | Shin et al. | |
| 2011/0145082 A1 | 6/2011 | Hammad | |
| 2011/0276493 A1 | 11/2011 | Graham, III et al. | |
| 2011/0313890 A1 | 12/2011 | Dicke et al. | |

OTHER PUBLICATIONS

Office Action dated Dec. 20, 2010, Interview Summary dated Mar. 8, 2011, Amendment dated Mar. 30, 2011, Amendment dated Jun. 13, 2011, and Notice of Allowance dated Oct. 11, 2011, in U.S. Appl. No. 12/609,922, filed Oct. 30, 2009, (52 pages).*

Office Action dated Sep. 11, 2012, Amendment dated Dec. 27, 2012, Interview Summary dated Dec. 31, 2012, and Final Office Action dated Aug. 16, 2013 in U.S. Appl. No. 12/915,005, filed Oct. 28, 2010, (73 pages).*

Office Action dated May 22, 2012, Interview Summary dated Aug. 20, 2012, Amendment dated Aug. 21, 2012, Final Office Action dated Sep. 26, 2012, Amendment dated Nov. 26, 2012 and Notice of Allowance dated Dec. 26, 2012 in U.S. Appl. No. 13/286,101, filed Oct. 31, 2011, (71 pages).

Office Action dated Aug. 29, 2011, Amendment dated Nov. 29, 2011, Final Office Action dated Apr. 16, 2012 and Amendment dated Jul. 16, 2012 in U.S. Appl. No. 12/650,343, filed Dec. 30, 2009, (81 pages).

Office Action dated Oct. 3, 2011, Amendment dated Feb. 3, 2012, Office Action dated Apr. 5, 2012 and Interview Summary dated Aug. 14, 2012 in U.S. Appl. No. 12/625,540, filed Nov. 24, 2009, (64 pages).

* cited by examiner

SYSTEMS METHODS AND COMPUTER PROGRAM PRODUCTS FOR DIRECTING CONSUMER FROM DIGITAL RECEIPT TO SOURCE OF SPECIFIC ITEM FOR REPEAT ITEM PURCHASE

CROSS-REFERENCE TO RELATED APPLICATION

This application is a continuation of U.S. application Ser. No. 13/014,554 filed Jan. 26, 2011, issued as U.S. Pat. No. 8,527,367 on Sep. 3, 2013, priority of which is claimed under 35 U.S.C. §120, and the contents of which are incorporated herein by reference as though set forth in full.

BACKGROUND

The invention is generally related to personal finance and e-commerce. Consumers purchase various goods and services at various times using credit card, debit card, automated teller machine (ATM) card, check and cash. Certain electronic transactions are recorded as line items within an account such as a checking or credit card account, which may be an on-line account accessible by a consumer using a computer. However, information about consumer purchases within these accounts and line items and may be limited to certain types of data such as transaction date, merchant identification and amount. Thus, these accounts do not include information identifying specific items purchased, and if a consumer wanted to purchase the same items again, the consumer would have limited options since these accounts do not specify the items purchased. Consumers can, if possible and able, determine item particulars from the item they currently have (if they still have the item), rely on their memory, take the time to travel to and shop at various merchant stores to search for the item and/or search for the item on-line. These methods may not be successful for various reasons and can be time consuming and frustrating, particularly if the item is not readily identifiable.

Other merchants, such as AMAZON.COM, present on-line summaries indicating order history and whether an order has shipped with the ability to track an order. These summaries, however, are passive or informational and do not allow consumers to purchase a particular item again from the informational summary displayed. Further, it is often the case that the item to be purchased again by a consumer is not included in these types of informational on-line summaries or was purchased too long ago, thus requiring the consumer to resort to the options mentioned above to try to determine a source of the same item that is desired.

For example, a consumer may have a favorite shirt that has become worn and the consumer desires to buy the same shirt again due to its particular design, fit and/or quality. The consumer may not recall that this particular shirt was purchased from a particular merchant such as MACY'S, when the shirt was purchased, and/or particulars about the shirt such as the type, style, color, size (e.g., the tag may have been removed or has become faded), or other particulars. Consequently, the consumer may not be able to locate the same shirt, assuming it is still manufactured, and may have to settle for a different shirt that is less desirable or not purchase any shirt, while taking the time to search for the same shirt.

SUMMARY

One embodiment is directed to a digital receipt comprising an electronic representation of a receipt including data identifying a specific item that was purchased by a consumer and an input element associated with the specific item. The electronic representation is displayable on a screen of a computing device of the consumer, and the input element can be selected, e.g., clicked on or executed, by a consumer, who is then directed from the electronic representation to a source or merchant offering the specific item for sale. For example, the upon clicking the input element, the consumer may be directed to a website of the merchant who offers the same item that was previously purchased to allow the consumer to buy the same item again. Thus, digital receipts according to embodiments allow a consumer to request to purchase an item and even add an item to an electronic shopping cart from outside of a merchant website.

Another embodiment is directed to a computer-implemented method for directing a consumer to a source or merchant offering for sale a specific item that was purchased by the consumer and comprises receiving, at a first or host computer, electronic receipt data from an electronic payment or transaction processing device a of merchant. The electronic receipt data identifies the specific item that was purchased by the consumer from the merchant, e.g., by an item serial number, Stock Keeping Unit (SKU) number, a model or part number or product description, such as item type and/or other attributes (depending on the type of item) such as size, color, weight, shape, style, and/or other attributes specifically identifying item. The method further comprises generating an electronic representation of a receipt for the purchase of that specific item. The electronic representation or digital receipt comprises data that identifies the item and also includes an input element associated with the item. When a consumer uses, for example, a computer or mobile communication device such as a Smartphone or tablet computing device to access the host computer, the electronic representation is displayed on a screen of the consumer computing device. The input element can be clicked or selected by the consumer resulting in the consumer being directed from the digital receipt to the source (such as a merchant website) that offers that same item for sale. The consumer can then immediately purchase the same item again through that merchant website or, knowing the identity of the merchant, call or visit the merchant to purchase the item by phone or in person if such merchant facilities and options are available and/or within the vicinity of the consumer.

A further embodiment is directed to a computer-implemented method for cross-selling a consumer to a merchant based at least in part upon prior consumer purchase of a specifically identified item from another merchant. The method comprises receiving, at a first or host computer, electronic receipt data from an electronic payment or transaction processing device of a first merchant from whom the consumer purchased a specific item identified by the electronic receipt data. The method further comprises identifying a second merchant that offers the same item for sale and generating, with the first or host computer, an electronic representation of a receipt for the purchase of the specific item from the first merchant. The electronic representation or digital receipt comprises data that identifies the specific item and an input element such as a graphic image, button or merchant or item logo, associated with the specific item. The digital receipt is displayed on a screen of a second computer of the consumer in communication with the first computer through a network. The consumer may select, click or execute the input element to be directed from the digital receipt to a website of the second merchant rather than a website of the first merchant from whom the consumer previously purchased the item. The consumer can then purchase the same item again through that second merchant website, or knowing the identity of the second merchant, call or visit the second merchant to order the same item by phone or in person.

A further embodiment is directed to a method performed by a consumer or user of a computing device that accesses a digital receipt account hosted by an intermediate computer. The consumer logs into the account, selects or views a digital receipt that includes item-level data about one or more items, and if the consumer decides to purchase an item within the digital receipt again, the user selects or clicks on an input element, e.g. in the form of a button or graphic image, to be directed from the digital receipt to a merchant website where the consumer can finalize the order for re-purchasing the item. Purchasing the item can be completed with a single click of the input element within the digital receipt as a result of any order form being automatically populated based on available account and receipt data, or the user can click on the input element, be directed to a website, then make one or more clicks to complete the purchase.

Another embodiment is directed to a system for directing a consumer to a source of a specific item previously purchased by the consumer. The system comprises a first or host computer in communication with a second computer of a consumer through a first network, and a receipt program executing on the first computer. The system may, in certain embodiments, also include the second computer of the consumer and/or a computer or website of a merchant who offers the specific item for sale. According to embodiments, the receipt program is configured to receive electronic receipt data from a computing device such as an electronic payment or transaction processing device of a merchant through a second network. The electronic receipt data identifies the specific item that was purchased by the consumer from the merchant. The receipt program is also configured to generate an electronic representation of a receipt that includes data identifying the specific item and an input element such as a graphic image, button or associated with the specific item. The electronic representation is displayed on a screen of a second computer of the consumer such that when the consumer selects, clicks or executes the input element, the consumer is directed to a source or merchant that offers the specific item for sale such as a merchant website.

System embodiments may also involve cross-selling a consumer who purchased a specific item from a first consumer to a second consumer by programming or encoding the input element to direct the consumer to the consumer to a merchant other than the merchant from whom the specific item was previously purchased.

Yet another embodiment is directed to a computer program product comprising a non-transitory computer readable storage medium embodying one or more instructions executable by a computer programmed to generate a digital receipt and direct a consumer from the digital receipt to a merchant that offers for sale the same item that was purchased before by the consumer. The one or more instructions may be stored on a computer readable medium or be part of a financial management system hosted by a computer that receives item-level transaction data.

In a single or multiple embodiments, the input element, such as a button, graphic image, banner, merchant logo or other data input element that can be selected, clicked or executed by a user and is displayed, e.g., within the electronic representation adjacent to data identifying the specific item. The data input element is encoded with, embodies or points or refers to an address of a website hosted by a computer of a merchant selling the specific item. Thus, when the consumer selects the input element, the data input element data is decoded to identify an address such as a URL address, and the consumer is directed to the website at which consumer can purchase the same item again.

In a single or multiple embodiments, the consumer selects, clicks, executes, activates or launches the input element to be directed to a page of a merchant website displaying the specific item or that includes information about the specific item. According to one embodiment, the website page may be a "check out" page in which the item is already added or included within an electronic order or electronic shopping cart (e.g., populated based on data from the consumer account or digital receipt) such that the consumer can immediately proceed to approve the order and purchase the item again, e.g., with a single click of a mouse or keypad.

In a single or multiple embodiments, the consumer is directed to a website or database of the same merchant from whom the consumer previously purchased the specific item as indicated in a digital receipt. In other embodiments, the consumer is directed to a different merchant such that even when the consumer purchased an item from a first merchant, the input element directs the consumer to a website of another merchant, e.g., for purposes of cross-selling, if the first merchant went out of business, if the website of the first merchant is down, if the first merchant no longer carriers or has the specific item in stock or for various other reasons.

In a single or multiple embodiments, an electronic representation of a receipt may identify multiple specific items. Each item, or only one or some of the items, within a digital receipt is associated with an input element such that the consumer can view an electronic representation of a receipt and be directed to a merchant website to purchase one or some or all of the identified items again from the same or different merchants. Thus, with embodiments, the same or a single person or party can implement, utilize or perform computer-implemented methods, systems and computer program products to determine which specific items were previously purchased by a consumer, determine which merchants offer those specific items for sale, encode an input element, and direct the consumer from an electronic representation of a receipt to a merchant website or other resource by clicking or selecting the input element and allow the consumer to purchase those same items again without knowing item particulars since item particulars are stored within the electronic representation or digital receipt and displayed to the consumer.

In a single or multiple embodiments, specific items are identified by item-level electronic transaction data, such as Level III data, which may identify the item by, e.g., serial number, model or part number, item description, SKU number, and with other data specifically identifying an item. The type of item-level information available and utilized may depend on the type of item purchased and to be identified. For example, for a clothing item, item-level details available may include clothing item number, manufacturer, color and size, whereas for a camera, item-level details may include manufacturer and model number.

BRIEF DESCRIPTION OF THE DRAWINGS

The foregoing and additional aspects of embodiments are described in further detail with reference to the accompanying drawings, wherein:

FIG. 8 illustrates a digital receipt constructed according to one embodiment and that includes item-level data for a specific item purchased by the consumer and an input element encoded or programmed to direct a consumer from the digital receipt to a website or other resource of a merchant offering the same specific item for sale;

FIGS. 10A-B illustrate examples of digital receipts constructed according to embodiments in which FIG. 10A illustrates certain items being associated with an input element, and FIG. 10B illustrates each item being associated with an input element;

FIGS. 13A-B are screen shots illustrating examples illustrating how embodiments may be implemented to direct a consumer from a digital receipt identifying a specific item to a website or resource of a merchant from whom a consumer may purchase the same item again.

DETAILED DESCRIPTION OF ILLUSTRATED EMBODIMENTS

Embodiments relate to computer-implemented methods, systems and computer program products that may be implemented, utilized or performed by a single person or party to analyze item-level transaction data generated by a merchant for consumer purchases and generate a digital receipt from which a consumer may be directed to a source such as a website offering the same item that was previously purchased by the consumer.

Figure 1:
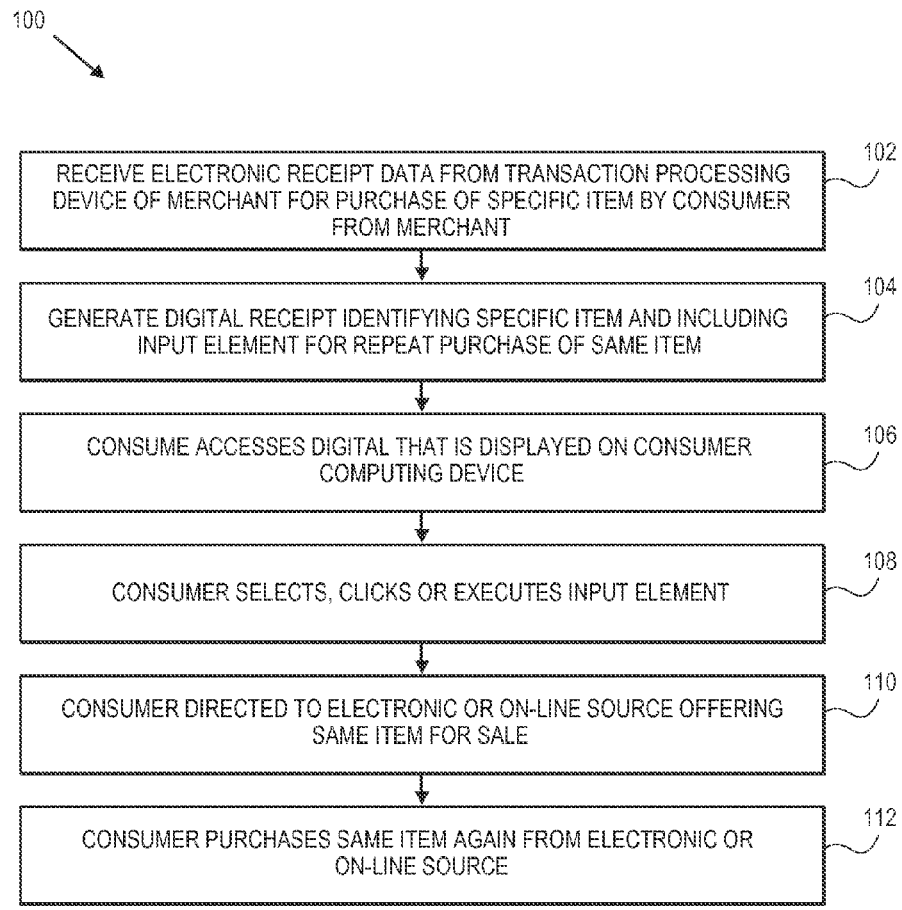
FIG. 1 is a flow chart of an embodiment of a method for directing a consumer from a digital receipt identifying a specific item to a source of the item such as a merchant website.

Referring to FIG. 1, a computer-implemented method 100 for directing a consumer to a source or website offering for sale a specific item identified as being previously purchased by the consumer comprises, at 102, receiving electronic transaction data from a transaction processing device of a merchant in connection with a purchase of the specific item by consumer from the merchant. At 104, an electronic representation of the receipt, or a digital receipt, is generated. The digital receipt identifies the specific item and also includes an input element that allows the consumer to be directed to a source of the item to purchase the same item again from the same or different merchant. At 106, the consumer logs into an account managed by a host, and the receipt program is executed display the digital receipt to the consumer on a screen of a consumer computing device. At 108, the consumer, selects, clicks or executes the input element associated with an item identified within the digital receipt such that, at 110, the consumer is directed to an electronic or on-line resource (such as a website) that offers the same specific item for sale, thus allowing the consumer, at 112, to purchase the same item again from the merchant to which the consumer was directed by the input element.

Thus, with embodiments, a digital receipt can be transformed into an e-commerce shopping experience and allowing a consumer to purchase the same item again even if the consumer does not recall the particulars about the item since item particulars are included in a digital receipt, and the consumer can be directed from the digital receipt identifying the specific item to a merchant offering that same specific item for sale. In this manner, embodiments allow consumers to quickly and easily purchase desirable or necessary items again, without having to remember or record item particulars or search for merchants offering the items.

Further, with embodiments, a receipt program can generate digital receipts that are adaptive or dynamic in that they can be changed or updated to reflect merchant inventory or item availability such that consumers know which merchants offer the specific item to be purchased again and are not required to spend time searching in-store and on-line for the item. This can be particularly helpful in cases in which consumers want to purchase a specific item again but the specific item has been discontinued or has limited availability.

Embodiments are also beneficial to hosts of a receipt program and to merchants due to the ability to encode or program a data element with various merchants who offer a specific item such that, for cross-selling purposes, a consumer who originally purchased an item from one merchant can be directed to another merchant for a repeat purchase of that same item. The merchant is also aware of the referring company or host such that relationships between hosts and merchants are further strengthened. Embodiments and aspects thereof are described in further detail with reference to FIGS. 2-14.

Figure 2:
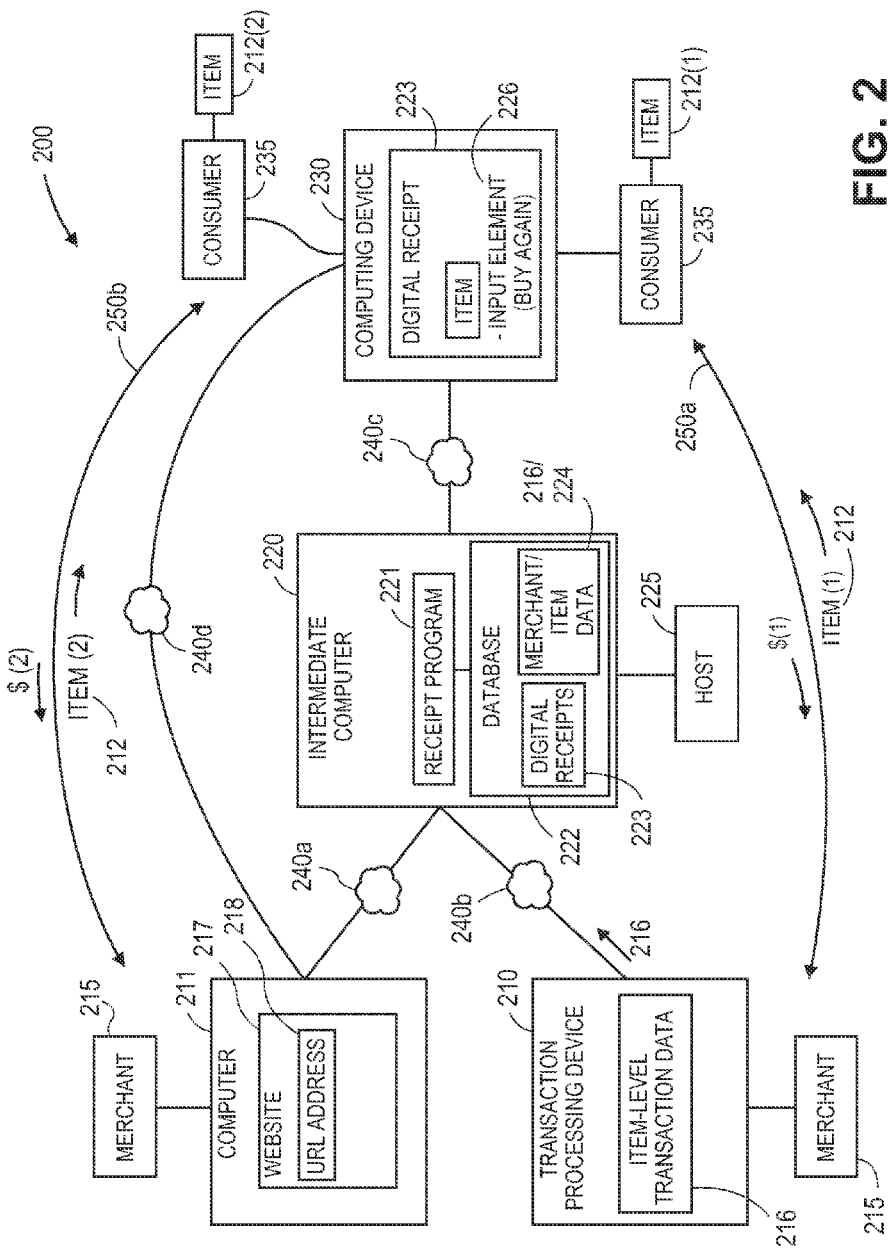
FIG. 2 is a schematic illustration of a system constructed according to one embodiment for directing a consumer from a digital receipt identifying a specific item to a source of the item such as a merchant website.

Referring to FIG. 2, a system 200 constructed according to one embodiment for directing a consumer from a digital receipt to a merchant or other source of a specific item for facilitating repeat or recurring purchases of the specific item comprises or may involve one or more merchants 215 (one merchant 215 is illustrated) who offer various items, goods or services (generally, "items" 212) for sale, a host 225 who collects item-level electronic transaction data 216 from merchants 215 and other originators of such data, and a consumer 235 who, according to embodiments, is presented with the opportunity to purchase a particular or specific item 212 again by being directed from a digital receipt or other electronic representation of a prior purchase of the item to a website or other resource of the same merchant 215 (as shown in FIG. 2) or a different merchant 215 (not illustrated in FIG. 2) from which consumer 235 may purchase the same item 212 again.

In the illustrated embodiment, merchant 215 utilizes a computing device, electronic payment or transaction processing device 210, e.g., a Point of Sale (POS) payment terminal, a cash register, and a computer and scanner system (generally, transaction processing device 210) to process consumer 135 purchases. A first or prior purchase 250a is illustrated as involving a first payment $(1) made by consumer 235 to merchant 215 for the first or prior purchase of an item 212(1) or Item (1). Transaction processing device 210 generates item-level electronic transaction data 216 for purchases made by consumer 235 when consumer 235 visits a merchant 215 store or purchases an item 212 on-line through a website 217 of merchant 215. While transaction processing device 210 and computer 211 are shown as separate components, it will be understood that embodiments may involve a single computing device, and that transaction processing device 210 and computer 211 may be part of the same merchant 215 system.

As defined in this specification, item-level electronic transaction data 216 identifies a specific, particular item 212 purchased by consumer 235. For example, item 212 may be specifically identified based at least in part upon one or more or all of the following item 212 attributes: item type, item brand, serial number, SKU number, merchant identification number, model number, part number, lot number, item description, color, size, quantity count, servings, flavor, weight, shape, etc. The types of data utilized to specifically identify an item 212 may vary with the type of item 212. One example of item-level electronic transaction data 216 that may be used for these purposes is Level III data, which specifies item attributes such as item quantity, item codes, descriptions and full line item details of items purchased by consumer 235.

As shown in FIG. 2, electronic transaction device 210 and/or merchant computer 211 are operably coupled to or in communication with intermediate computer 220 managed by host 225, an example of which is Intuit Inc. or another host that collects or receives electronic item-level data 216. The host 225 may be the single person or party that implements, utilizes or performs method and system embodiments. Host or intermediate computer 220 is also operably coupled to a consumer computing device 230 such as a computer, mobile communication device (e.g., cellular telephone, Smartphone or other mobile communication device) or tablet computing device capable of communicating with host computer wirelessly or through a wire connection. For ease of explanation, reference is made generally to computing device 230 of consumer 235.

For purposes of communications between system 200 components, electronic transaction device 210 and/or computer 211 of merchant 215 are operably coupled to or in communication with intermediate computer 220 through respective networks 240a-b, and intermediate computer 220 is operably coupled to or in communication with consumer computing device 230 through network 240c. As described in further detail below, host computer 220 and/or consumer computing device 230 may also be operably coupled to or in communication with one or more additional computers hosting respective websites of other merchants, which may also be accessed by consumer computing device 235. Examples of networks 240a-c (generally, 240) and other networks 240 discussed herein that may be utilized for communications between system 200 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 240 generally, but various networks, combinations of networks and communication systems, methods and protocols may be utilized.

As generally illustrated in FIG. 2, intermediate or host computer 220 includes or accesses receipt program 221 and one or more data stores or databases 222 for generating and storing digital receipts 223 and associated item-level receipt data 216 and data 224 identifying which merchants 215 offer which items 212 for sale. Consumer 235 executes a browser 232 on computing device 230 to access an account consumer 235 has with host 225 to view consumer's digital receipts 223, which are displayed on a screen of computing device 230 as generally illustrated in FIG. 2. According to embodiments, a digital receipt 223 includes item-level data about an item 212 that was purchased by consumer 235 and also includes an input element 226 that can be selected, clicked or executed by consumer 135 to be directed to a merchant website 217 or other source to purchase the same item 212 again. A second or repeat purchase 250b of the same item is illustrated as involving a second payment $(2) made by consumer 235 to the same or different merchant 215 for the second or repeat purchase of the item 212(2) or Item (2).

In a single or multiple embodiments, receipt program 221 is a stand-alone program executing on or accessible by host computer 225. In other embodiments, receipt program 221 is a component or module of a financial management system (FMS) that receives item-level transaction data 216 from transaction processing devices 215 and/or other sources of such data. Examples of a FMS in which embodiments may be implemented or that may be adapted to execute or utilize embodiments include QUICKRECEIPTS, QUICKEN, FINANCEWORKS and MINT. QUICKRECEIPTS, QUICKEN, FINANCEWORKS and MINT are registered trademarks of Intuit Inc.

A FMS or receipt program 221 such as QUICKRECEIPTS that may execute or utilize embodiments is managed by host 225 with whom participating merchants 215 have agreed to provide item level-receipt data 216 associated with a particular consumer 235, e.g., based on purchases made by consumer 235 using a certain membership card, club card or other identifying information. For example, when consumer 235 registers a credit card with host 225, item-level receipt data 216 generated by transaction processing device 210 and received at intermediate computer 220 is allocated by receipt program 221 to consumer 230.

A FMS is defined to include, any computing system implemented, on-line or web-based, system, package, program, module, or application that gathers financial data, has the capability to receive or retrieve financial data including item-level electronic transaction data 216, analyze and categorize at least part of the financial data into various reports or displays that are provided to consumer 235, and provide consumer 235 with the capability to conduct, and/or monitor, financial transactions. Further aspects examples of a FMS or receipt program 221 that may embody, utilize or be adapted to embody or utilize embodiments are described in http://myquickreceipts.intuit.ccom; http://www.financeworks.com, and U.S. Pat. No. 8,095,439 (application Ser. No. 12/609,922), the contents of which are incorporated herein by reference as though set forth in full. For ease of explanation, reference is made generally to a receipt program 221.

Figure 3:
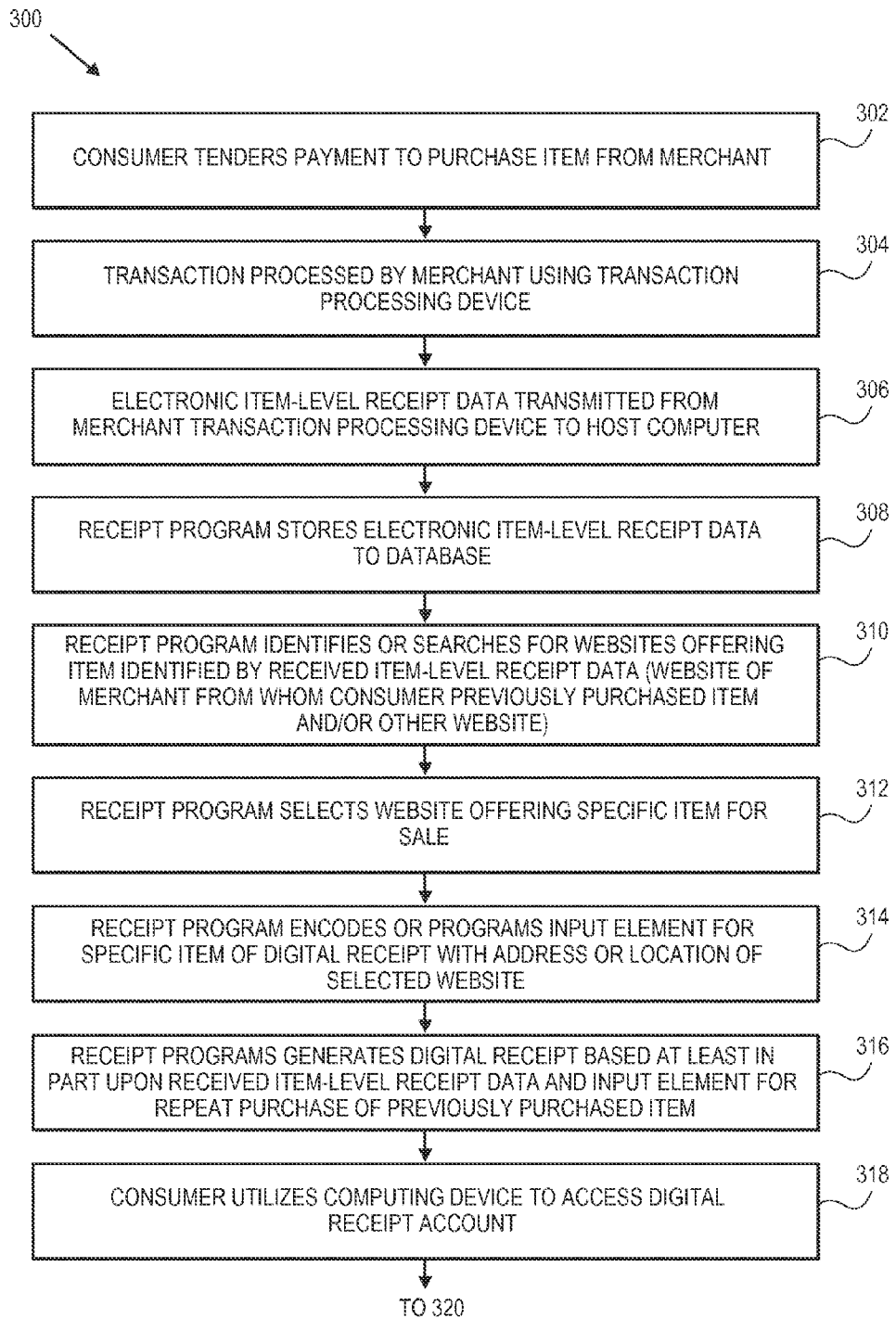
FIG. 3 is a flow chart of an embodiment of a method for directing a consumer from a digital receipt identifying a specific item to a source of the item and further illustrating how item-level receipt data is collected and analyzed by a digital receipt program that also generates and encodes an input element for repeat purchases of an item identified within the digital receipt.
Figure 3:
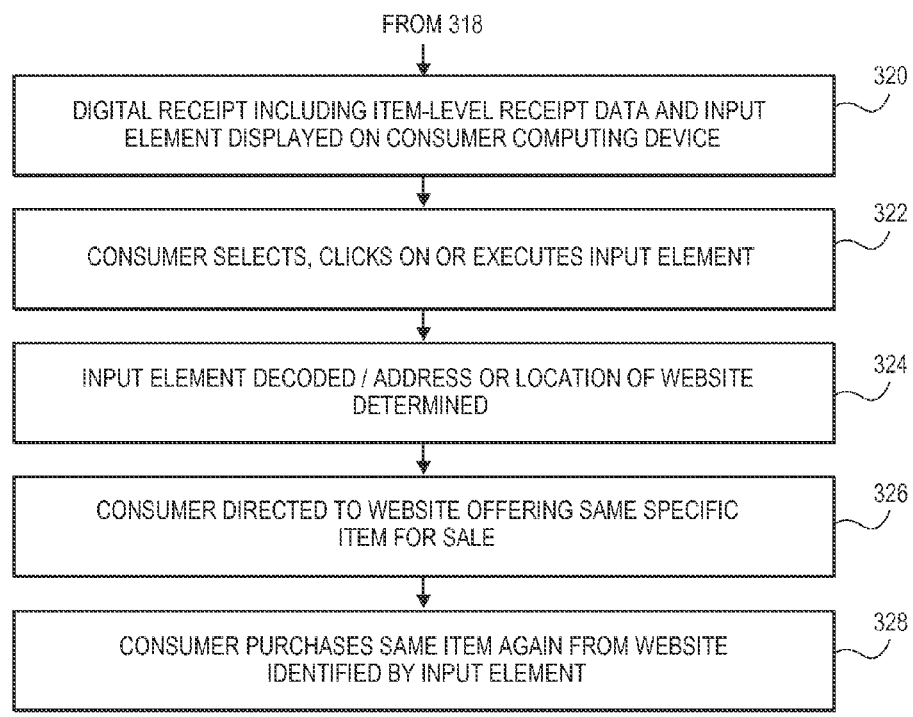
Figure 4:
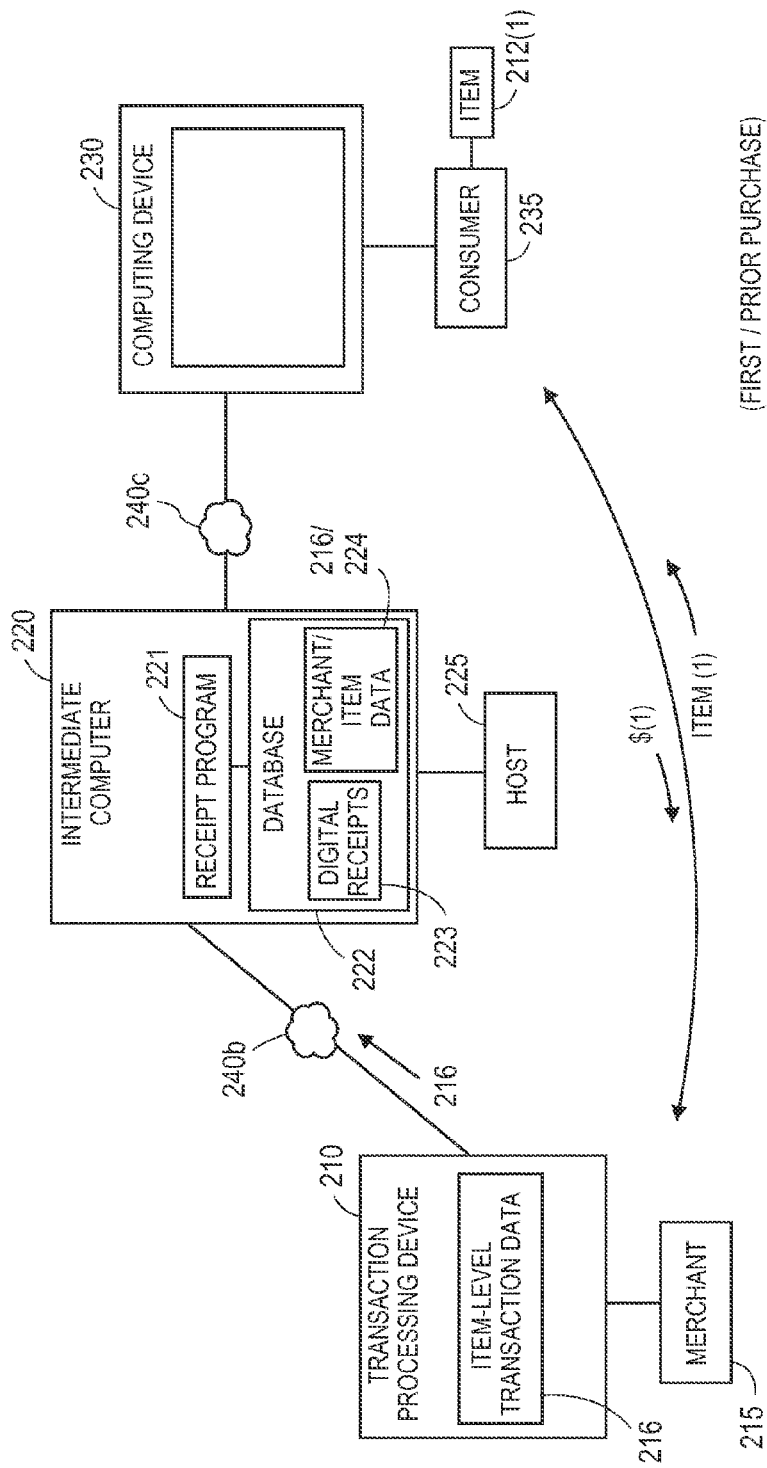
FIG. 4 illustrates aspects of FIG. 2 related to a consumer purchasing an item and a receipt program receiving item-level receipt data from a transaction processing device of a merchant for that purchase.

Referring to FIG. 3 and with further reference to FIG. 4 (showing portions of FIG. 2 related to first or prior item purchase), one embodiment of a method 300 for directing consumer 235 from a digital receipt 223 to a website 217 or other resource of merchant 215 offering for sale a specific item 212 previously purchased by consumer 235 and using system 200 components described above comprises, at 302, consumer 235 tendering payment (represented as "$" in FIG. 4) for purchase of item 212 from merchant 215.

Embodiments may involve consumer 235 purchasing various items 212, goods and services (G/S) (generally "items" 212) from various types of merchants 215. References to an "item" 212 are defined to include goods and services, and references to purchasing item 212 from a "merchant" 215 are defined to include purchases from in-store or brick and mortar merchants, from websites 217 of merchants 215 who also have stores, and from on-line merchants 215 that sell items 212 through respective websites 217 or other on-line or electronic methods or channels. For example, merchant 215 may offer items 212 in stores and on-line (e.g. merchants 215 such as MACYS, TARGET and HOME DEPOT) whereas other merchants 215 are on-line merchants such as AMAZON and EBAY. Payment may be made using a transaction card (e.g., credit card, debit card, gift card, etc.), check, cash and other forms of payment. Further, at the time of payment, a consumer 235 membership or club card can be entered or scanned by merchant 215 such that transaction data 216 transmitted from merchant 215 to host identifies consumer 235 as making the purchase.

At 304, the transaction is processed by merchant 215 using transaction processing device 210, and at 306, electronic item-level receipt data 216 for the purchase of item 212 is transmitted from transaction processing device 210 to host computer 220. With electronic types of transaction processing devices 210, transaction or receipt data 216 can be stored electronically, and in the event of a cash payment, merchant 215 may enter transaction or receipt data 216 manually in order to generate electronic receipt data 216 to be sent to host computer 220. Receipt data 216 is item specific in that the item 212 is specifically or particularly identified. Item-level receipt data 216 may also include other related data such as a name and address of merchant 215, a transaction date, a transaction amount, and information related to the form of payment (e.g., credit card, debit card, etc.).

With continuing reference to FIGS. 3-4, at 306, item-level receipt data 216 is transmitted from transaction processing device 220 of merchant 215 to intermediate or host computer 225 that collects or aggregates item-level receipt data 216 related to various consumers 235 from respective merchants 215, and at 308, receipt program 221 stores electronic item-level transaction data 216 to database 222. One example of host computer 220 that may be utilized for this purpose is a computer or server of Intuit Inc. such as a QUICKRECEIPTS server if QUICKRECEIPTS is utilized as receipt program 221 or a computer or server of another FMS that collects item-level receipt data 216.

At 310, according to certain embodiments, receipt program 221 identifies or searches for electronic or on-line source(s) of specific item 212 identified by item-level receipt data 216. Thus, as shown in FIG. 5, receipt program 221 stores item-level transaction data 216 within a table or other data structure 500 that indicates which items 212 were purchased by consumer 235 from which merchants 215 and/or which merchants 215 offer which items 212 based on prior consumer 235 purchases.

In the illustrated embodiment, the table 500 includes a column 501 identifying items 212 purchased, a column 502 indicating a merchant 215 from whom an item 212 was purchased, and a column 503 indicating an address or location 218 of a website 217, database or other resource of merchant 215, e.g., a URL address 218 of a website 217 that can be used to purchase items from merchant 215 again at a later time. The URL address 218 may be determined from transaction data 216 if the purchase was made on-line and URL address 218 is included or otherwise known, determined or generated by receipt program 221 (e.g., by searching for item 212 on merchant website 218), or requested by receipt program 221 and received at host computer 220 from merchant computer 211. URL address 218 may, in certain embodiments, be a trackable URL address when clicked or tapped by a user or consumer 235 or club or loyalty card member who uses a service such as QUICKRECEIPTS. For example, a URL address 218 may be appended with an affiliate type code or a string that allows for tracking at a later date. A shortened version of a URL address may also be utilized, similar to services such as www.Bit.ly. For ease of explanation, reference is made generally to a URL address 218.

Figure 5:
FIG. 5 generally illustrates a table or database for storing data indicating which merchants offer which items and electronic addresses of merchants.

Thus, as an example shown in FIG. 5, consumer 135 may have purchased three items 212a-c from Merchant 1 (M1), and receipt program 221 generates or updates table 500 to reflect that Merchant 1 offers Items 1-3, and information about Items 1-3 is located at respective pages of website 217 with respective URL addresses 218a-c (A1-1, A1-2 and A1-3, wherein "A" refers to "Address," the first number "1" refers to Merchant 1, and the second number refers to a number of an item 212 offered by merchant 215.

Figure 6A:
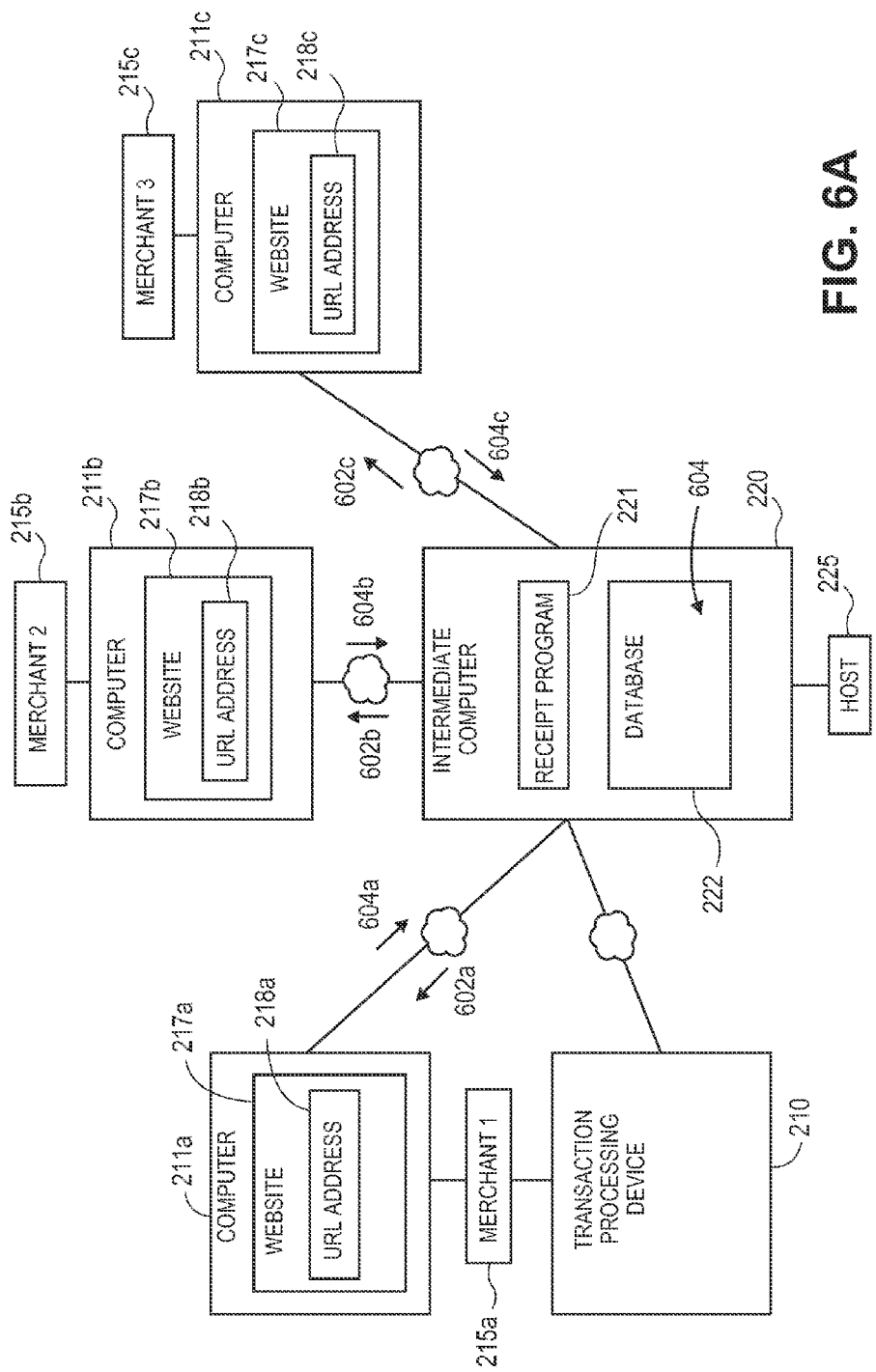
FIGS. 6A-C generally illustrate a receipt program searching for other sources of a specific item and the table or database being updated with search results that may be prioritized.
Figures 6B, 6C:
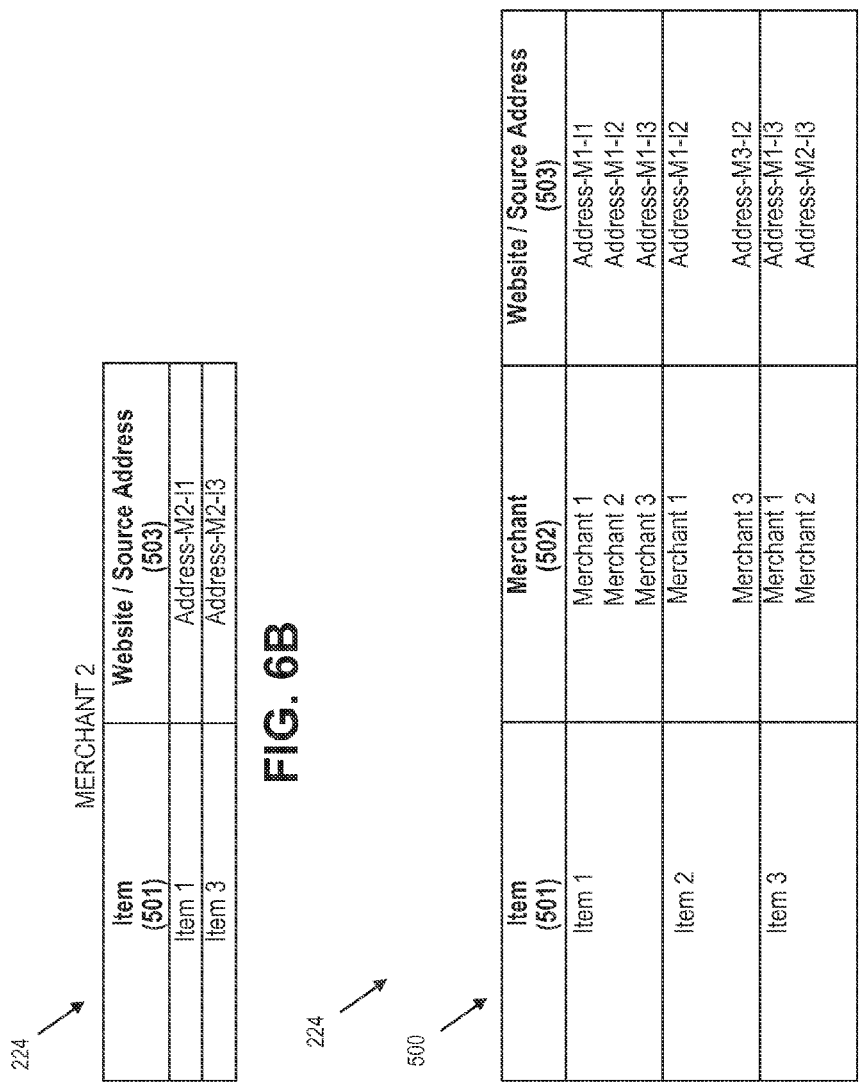

According to one embodiment, as illustrated in FIG. 5, table 500 is populated with data based on prior consumer 135 purchases. Referring to FIGS. 6A-C, according to another embodiment, table 500 is populated with data that is a result 604 of searches or requests 602 made by receipt program 221 to a merchant computer 211. According to another embodiment, table 500 is populated with data based on both prior consumer 135 purchases and the result 604 of searches or requests 602 by receipt program 221.

For example, referring to FIG. 6A, receipt program 221 may search for or issue requests 602 to computers 211 of merchants to determine whether other merchants 215 offer for sale the specific item 212 that was purchased by consumer 235. As illustrated in FIG. 6A, receipt program 221 may be operably coupled to or in communication with other merchant computers 211 via respective networks 240d-e, and the results 604 of the requests or searches 602 can be used to modify or update table 500.

For example, upon identifying item 212 purchased by consumer 235, receipt program 221 may search or crawl various merchant or e-commerce websites 217 to determine which merchants 215 or websites 217 offer the identified item 212 for sale and update the table 500 accordingly. For this purpose, receipt program 221 may be configured to determine whether item 212 is present on a website 217 and/or whether a computer or database of merchant 215 indicates that item 212 is in stock. For these purposes, request or search 602 criteria may include various types of item-specific data 216 such as item number, part number, model number, and other data that specifically identifies the item 212. Receipt program 221 may conduct searches or issue requests 602 for particular items 212 as they are purchased or periodically to update table 500 to ensure that table 500 accurately reflects merchants 215 who still offer or have item 212 for sale.

For example, as shown in FIG. 6B, receipt program 221 determines that Merchant 2 offers two items (Item 1 and Item 3 in column 602) and respective URL addresses 218a,b (Address-M2-I1 and Address-M2-I3 in column 604) of website pages 217a,b describe or are related to those two Items 1 and 3. This data may be used to update table 500 as shown in FIG.

6C, which illustrates that table 500 was updated to include data of FIG. 6B and also that Merchant 3 also offers two items (Item 1 and Item 2) and respective URL addresses Address-M3-I1 and Address-M3-I2 in column 604. Thus, table 500 may identify merchant 215 and website address 218 information only for merchants 215 from whom consumer 235 purchased item 212 and/or other merchants 215, e.g., merchants 215*b,c*, which also offer the same item 212 but from which consumer 235 may not have purchased the item 212 before.

Receipt program 221 will eventually access table 500 to identify merchant 215 that offers item 212 for sale, and will have to select one or multiple merchants 215 for this purpose. According to one embodiment, the order of merchants 215 to be selected is prioritized such that when merchant 215 is to be identified as offering a certain item 212 for sale, certain merchants 215 will be identified whereas others are not or identified first or more frequently than other merchants 215. For example, according to one embodiment, pre-determined prioritization criteria includes whether consumer 235 purchased item 212 from merchant 215 in the past, and if so, then that merchant 215 is identified or identified first and has priority over other merchants 215. As another example, if consumer 235 purchased the same item 216 from multiple merchants, pre-determined criteria may be the most recent purchase such that the merchant 215 from whom consumer 235 has purchased item 212 most recently is identified, identified first or identified more frequently than other merchants. Pre-determined criteria may also involve a number of times consumer 235 has purchased the item 212 from each merchant 215. Pre-determined criteria may also involve a combination of these and/or other factors.

Figure 7:
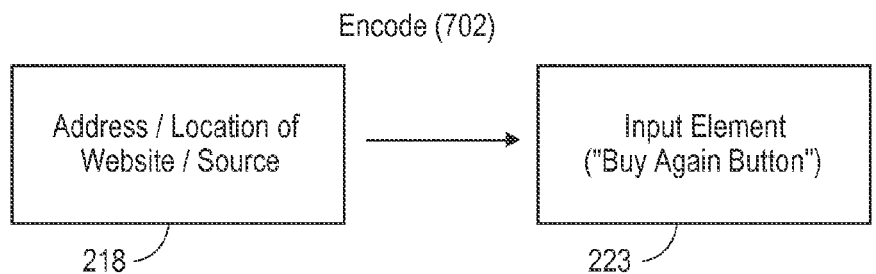
FIG. 7 generally illustrates an input element associated with a specific item being encoded or programmed with an address or location of a website or other resource of a merchant that offers the same specific item for sale.

Referring again to FIG. 3, at 312, receipt program 221 identifies or selects an electronic or on-line source of specific item 212, and at 314, and with further reference to FIG. 7, determines or reads the website 217 or other Internet or network address 218 of the identified or selected electronic or on-line source from table 500. Receipt program 221 encodes or programs 702 input element 226 associated with specific item 212 for which a digital receipt 223 is generated with the address or location 218 of the identified or selected electronic or on-line source 217. For example, input element 226 may be encoded with, refer to or point to a URL address or link to a merchant website 217.

Figure 8:
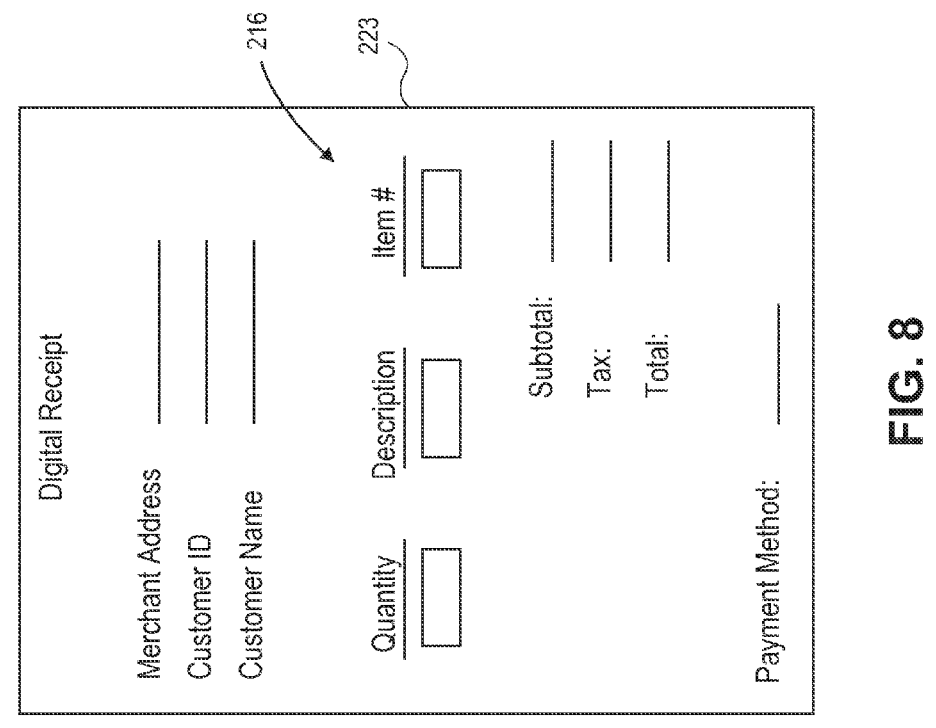

With continuing reference to FIG. 3, and with further reference to FIG. 8, receipt program 221, having item-level data 216 for specific item 212 and address 218 of merchant website 217 or other source, generates a digital receipt 223 including received item-level receipt data 216 and the encoded input element 226 at 316. Input element 226 may be a button or other interface or input element and may be identified by a graphic image including a phrase related to a repeat purchase of an item such as "rebuy" or "buy again" or "repeat purchase." Further, input element 226 may be in the form of a logo of merchant 215 from whom consumer 235 previously purchased item 232 or a logo of merchant 325 selected by receipt program 221 as being the merchant 215 that would process a request by consumer 235 to purchase item 212 again.

Additionally, as explained in further detail in U.S. Pat. No. 8,095,439 (application Ser. No. 12/609,922 filed on Oct. 30, 2009), the contents of which are hereby incorporated by reference as though set forth in full, digital receipt 223 may include various types of item-level data 216. The types of which may depend on the item 212. For example, digital receipt 223 may specify an item 212 by serial, part or model number, purchase date, store number, store location, method of payment, quantity, membership or club number, price, tax, and total. As another example, for an item 212 of clothing, the item-level data 216 within digital receipt 223 may specify quantity, brand, fit, color, size, style, etc.

Figure 9:
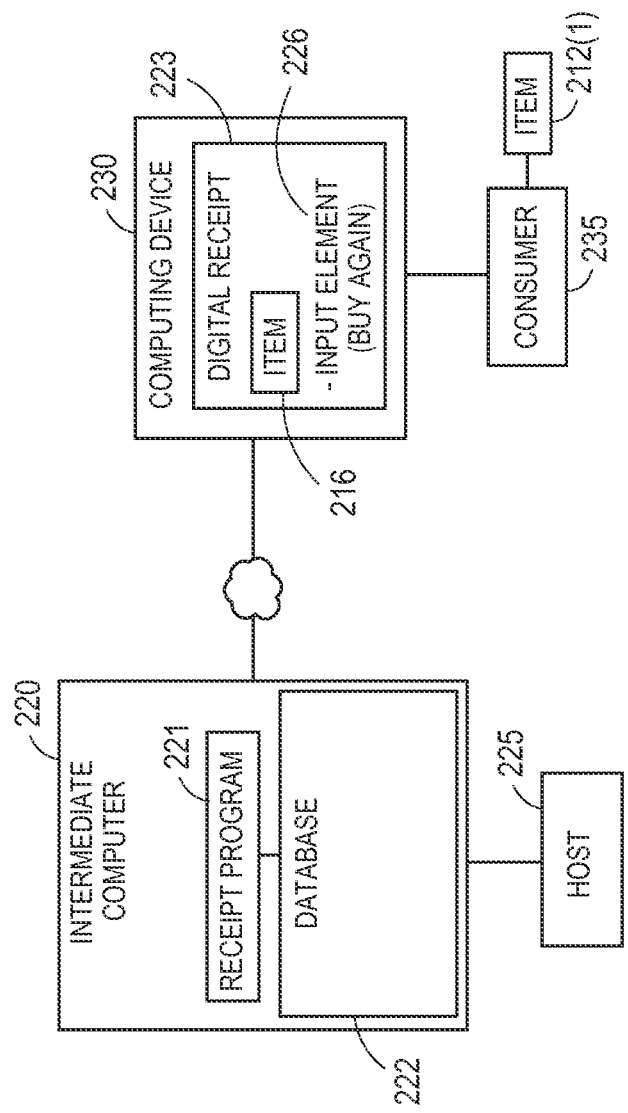
FIG. 9 illustrates aspects of FIG. 2 related to a consumer logging onto an account and viewing a digital receipt constructed according to embodiments.

With continuing reference to FIG. 3 and with further reference to FIG. 9, at 318, consumer 235 utilizes computing device 230 to access an account consumer 235 has with host to access consumer's digital receipts 223 stored or managed by intermediate computer 220. At 320, and with further reference to FIG. 10A, digital receipt 223 generated by receipt program 221 and including item-level receipt data 216 and the "rebuy" or "repeat purchase" input element 226 is displayed on consumer computing device 230.

Figure 10A:
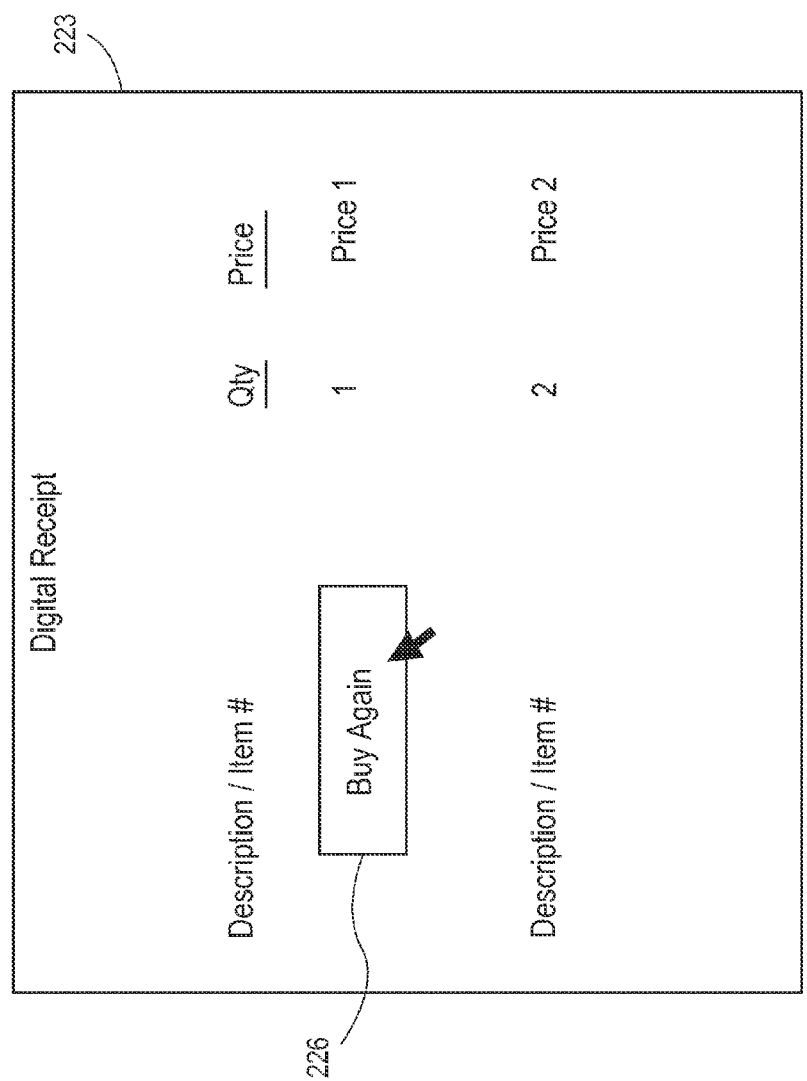

In the embodiment illustrated in FIG. 10A, digital receipt 233 for purchases from merchant 215 identifies multiple (e.g., two) items 212*a,b* and related item-level data 216*a,b*. As shown in FIG. 10A, some, but not all, of the items 212 identified within digital receipt 223, may be associated with an input element 226, whereas referring to FIG. 10B, each item 212*a,b* is associated with an input element 226*a,b*. Whether input element 226 is generated for a particular item 212 may depend on whether receipt program 221 can confirm that item 212 is available from merchant 215 based on data from the transaction processing device 210, searches and/or requests 602 for item 212 conducted by receipt program 212 to confirm whether merchant 215 offers the item 212 and/or has the item 212 in inventory. Further, item 212 may be discontinued and no longer available.

Figure 10B:
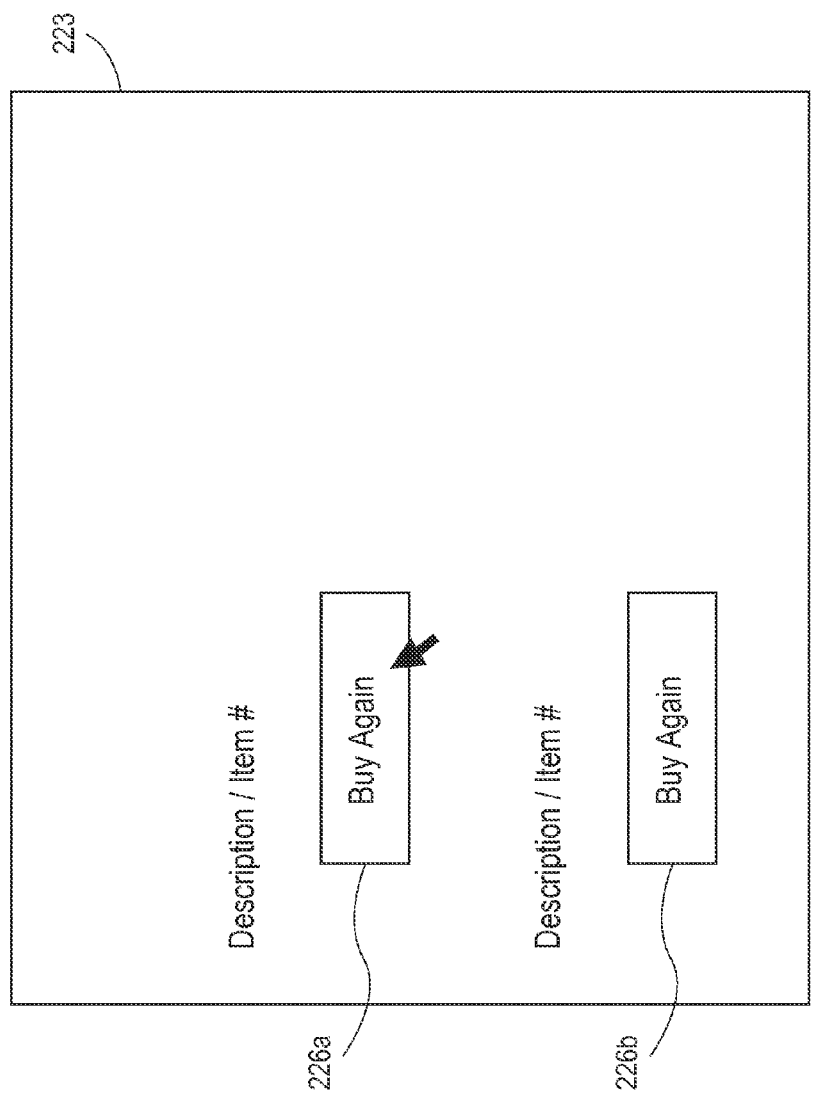

In the illustrated embodiment, input element 226 is displayed within or part of digital receipt 223. For example, input element 226 may be displayed adjacent to, e.g., below, an identified item 212. It will be understood that other configurations and arrangements may be utilized, and that FIGS. 10A-B are provide to illustrate examples of how embodiments of digital receipts 223 including input elements 226 may be implemented.

Figure 11:
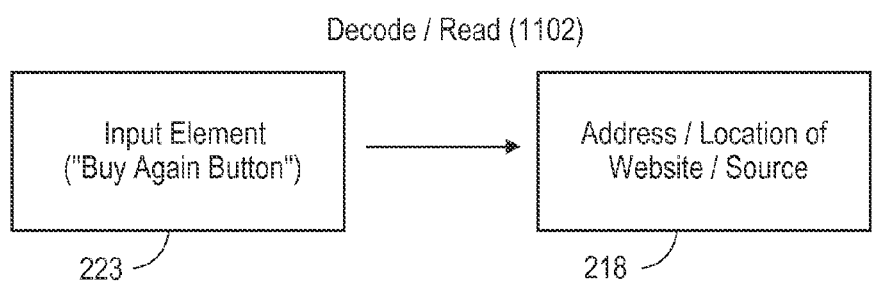
FIG. 11 generally illustrates an input element associated with a specific item being decoded or read to determine an address or location of a merchant that offers the same specific item for sale.

Referring again to FIG. 3, at 322, consumer 135 selects, clicks, or executes input element 226 (generally illustrated in FIGS. 10A-B as arrow or pointer clicking on input element 226) which, at 324, results in input element 226 being decoded or read 1102 as generally illustrated in FIG. 11, e.g. by browser 232 executing on consumer computing device 230, which, at 326, directs consumer 235 to website 217 corresponding to the decoded URL address 217 that offers the same item 212 for sale. At 328, if necessary, consumer 325 navigates any additional pages or screens of website 217 to complete and submit an order to purchase the same item 212 again.

According to one embodiment, consumer 235 is directed to a website 217 that includes information about the item 212. Consumer 235 may then navigate additional screens or pages of website 217 as necessary to select item 212, add item 212 to an electronic shopping cart, and check out or purchase item 212. Consumer 235, having information about merchant 215 as a result of being directed to merchant website 217, may also call merchant 215 to buy the item 212 again or visit merchant 215 store to purchase item 212.

According to another embodiment, consumer 235 clicks on input element 226 and is then directed to a website 217 including information about item 212 and then clicks a button or other element to add item 212 to an electronic shopping cart. Consumer 235 can then, as necessary, navigate additional screens or pages of website 217 to finalize the purchase. According to a further embodiment, consumer 235 clicks on input element 226 and is then directed to a website 217 in which item 212 is already added to an electronic shopping cart and the page includes a "purchase" button that may be clicked or selected by consumer 235 to purchase item 212.

Thus, embodiments can be configured such that consumer 235 can purchase the item 212 again with a single click of input element 226 or a single click of a purchase button within a screen or page of website 217 to which consumer was directed as a result of clicking input element 226. In yet another embodiment, clicking input element 226 is a request to purchase item 212 again with no further navigation required such that 1-click repurchase is possible from digital receipt 223.

Figure 12A:
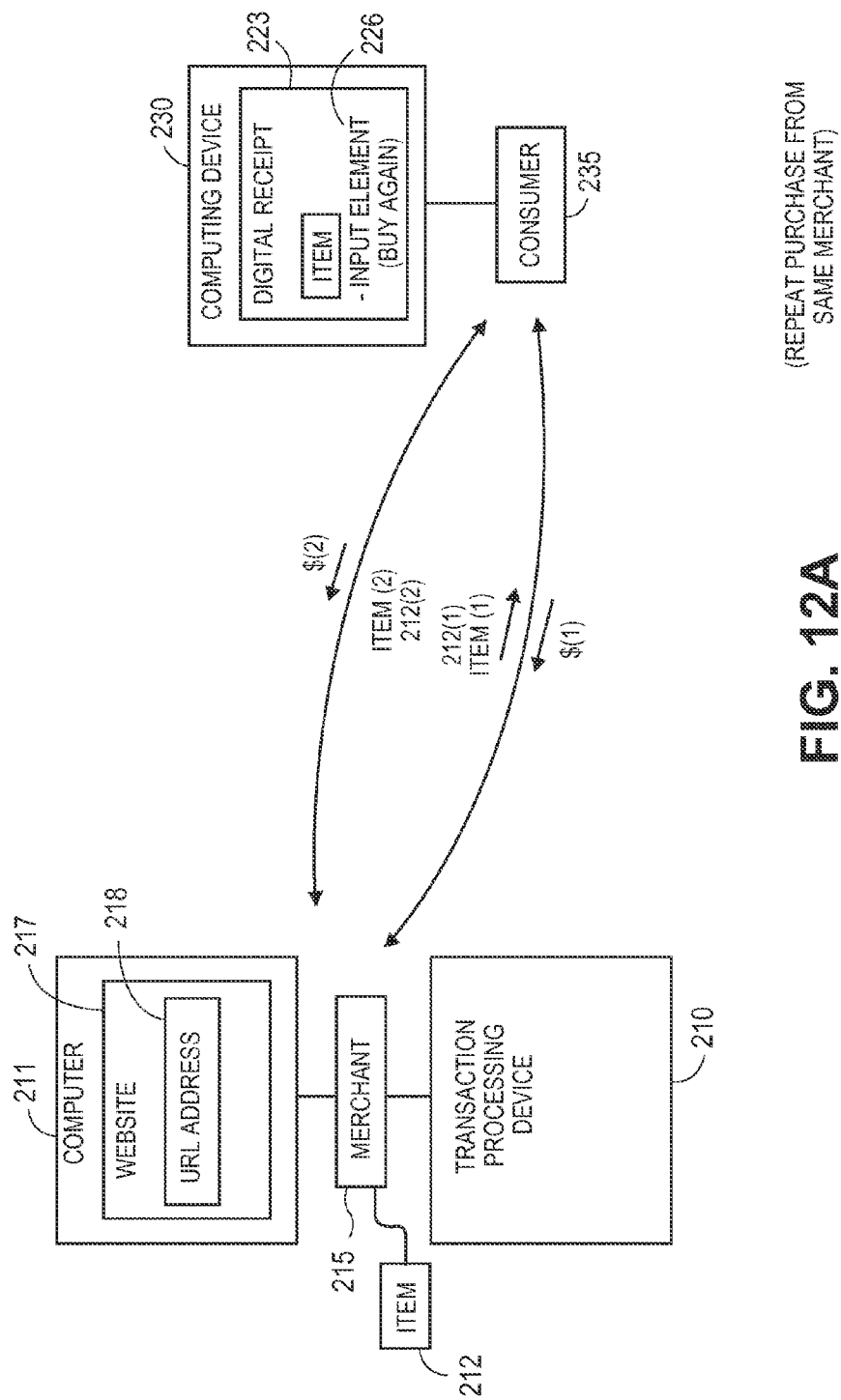
FIG. 12A illustrates aspects of FIG. 2 related to an embodiment in which a consumer is directed to the same merchant from whom the specific item was previously purchased.

Referring to FIG. 12A, in one embodiment, receipt program 221 is configured to select a merchant 215a from whom consumer 235 has previously purchased 250a the identified item 212 such that input element 226 is encoded 702 with a URL address 218 of a website 217 of that merchant 215a, and consumer 235 is directed to the website 217 of the merchant 215a from whom consumer 235 previously purchased the item 212. Consumer 235 can purchase the same item 232 again 250b on-line through website 217 or by calling or visiting merchant 215a.

Figure 12B:
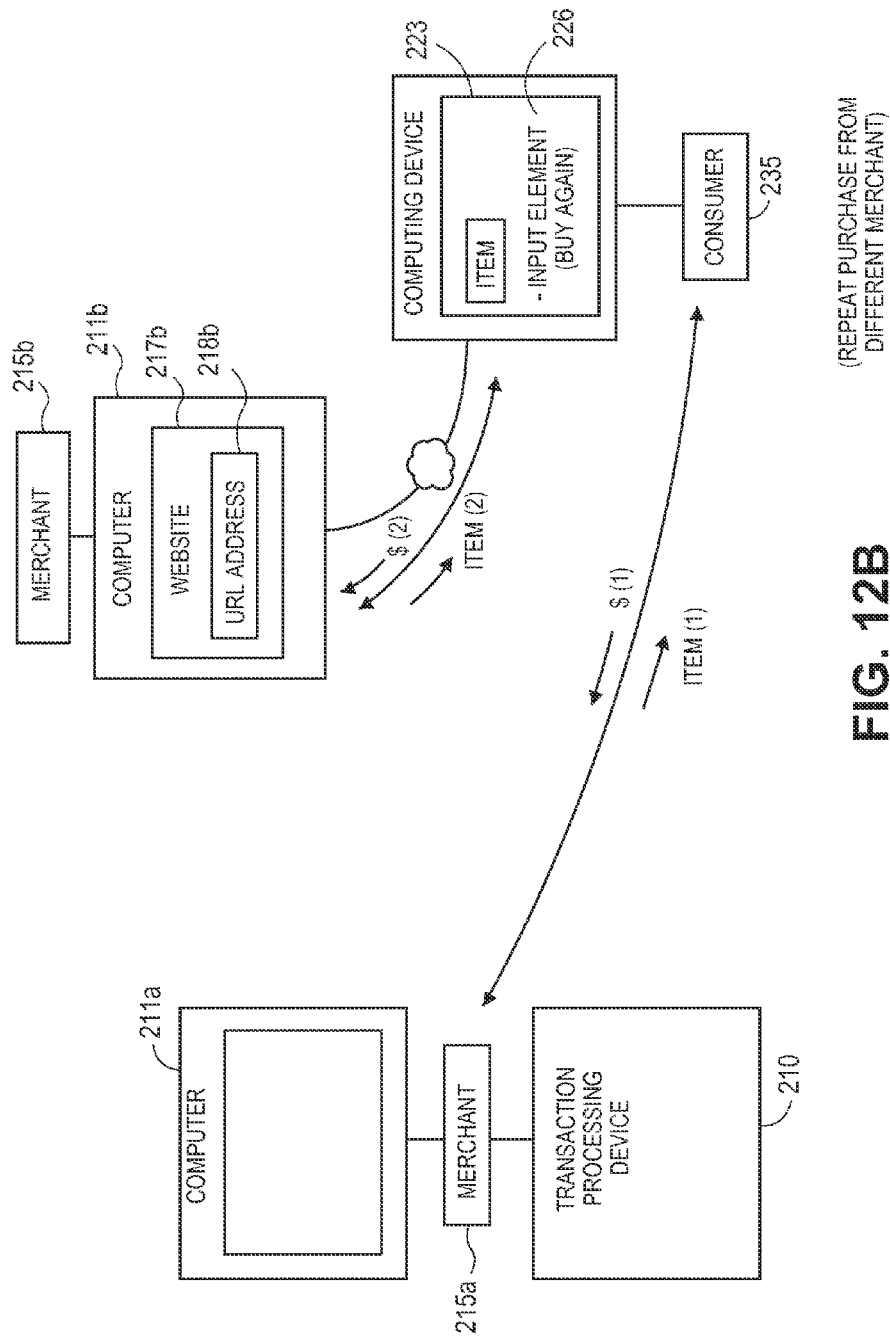
FIG. 12B illustrates aspects of FIG. 2 related to an embodiment in which a consumer is directed to a merchant other than the merchant from whom the specific item was previously purchased.

Referring to FIG. 12B, in another embodiment, receipt program 221 is configured to select a merchant 215b from whom consumer 235 has not previously purchased 250a identified item 212 or a merchant 215b selected without regard to pre-determined criteria for establishing merchant priority within table 500 such that input element 226 is encoded 702 with a URL address 218 of a website 217 of a different merchant 215b, and consumer 235 is directed to the website 217 of the different merchant 215b, and consumer 235 can purchase the same item 212 again 250b on-line through the website 218 of the different merchant 215b or by calling or visiting merchant 215b. Such embodiments are helpful when a first merchant 215a previously sold the item 212 but no longer sells the item 212 due to various reasons such as the item 212 being discontinued, the merchant 215a is sold out, the merchant 215a and item manufacturer could not reach a purchase or supply agreement, etc. Further, such embodiments are beneficial to the referring host 225 and the other merchant 215b since the other merchant 215b may have a relationship with host 225 and in furtherance of that relationship, host 225 refers or cross-sells consumers 235 to other merchant 215b. Input element 226 can be encoded 702 such that when consumer 235 clicks on input element 226 to decode 1102 address 218, the other merchant 215b knows that consumer 235 was referred by host 225.

Figure 13A:
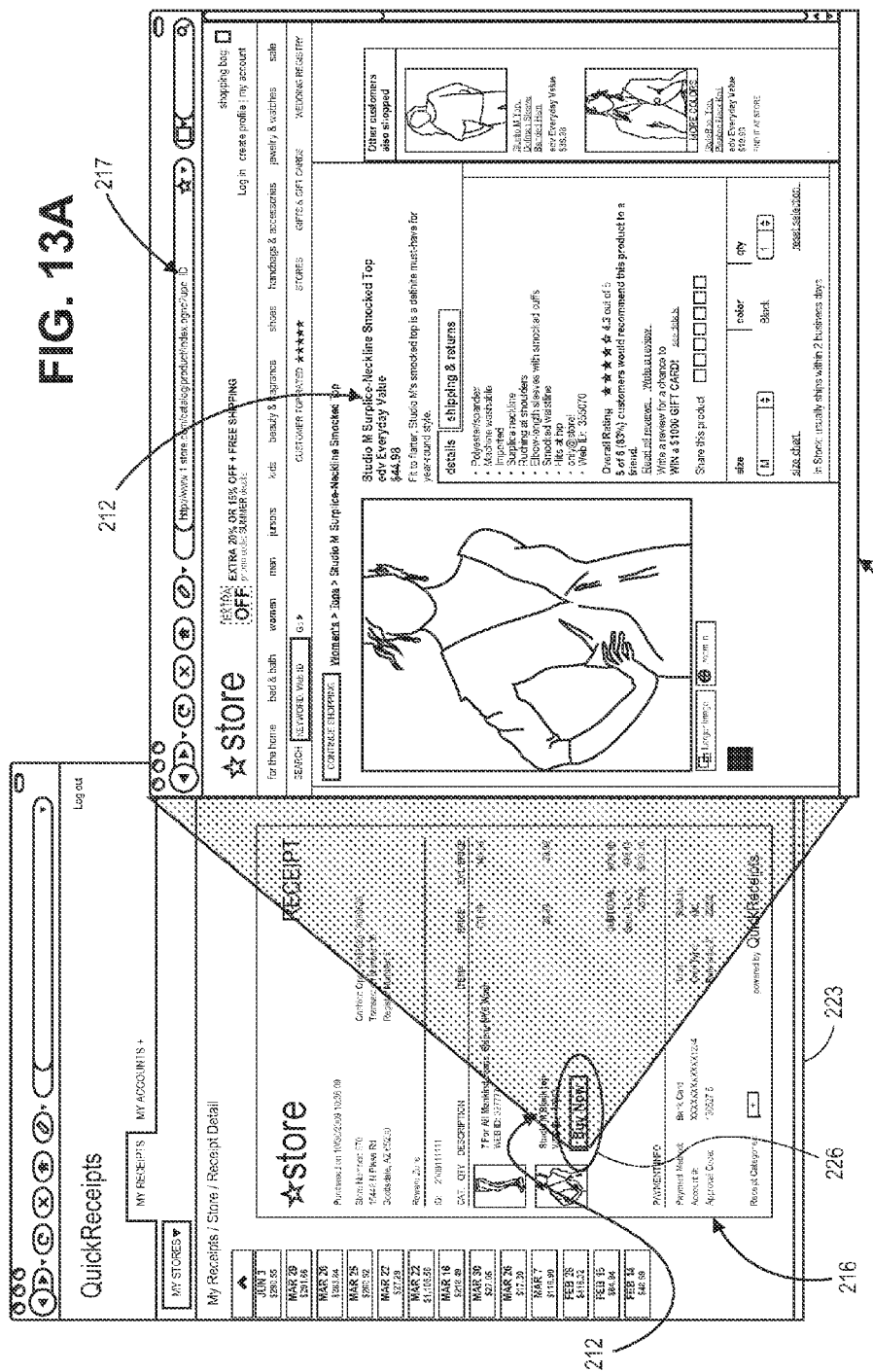
Figure 13B:
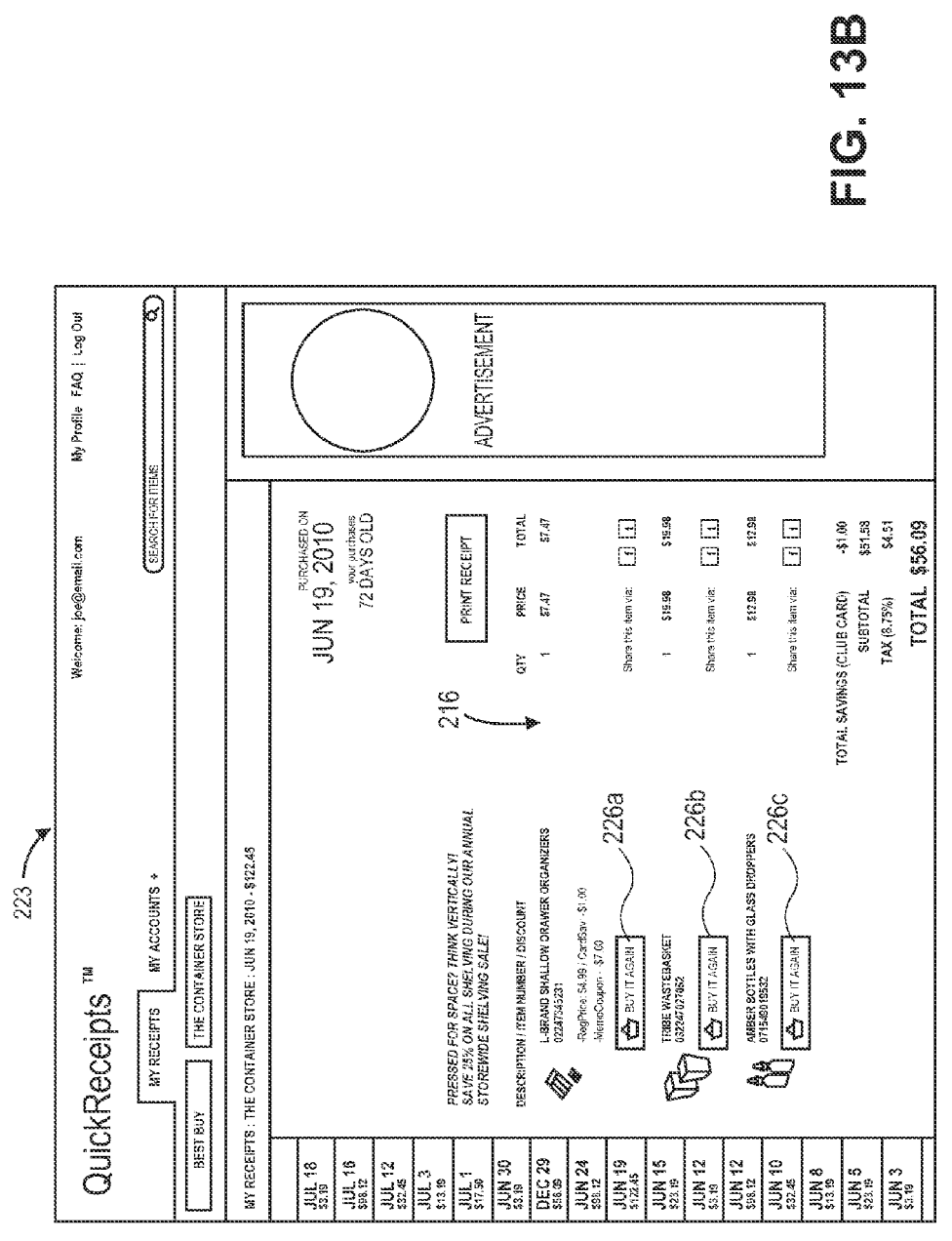

FIGS. 13A-B illustrate examples of screen shots showing how embodiments may be implemented. Referring to FIG. 13A, a consumer 235 is presented with a digital receipt 223 for MACYS that specifically identifies various items including "7 For All Mankind Jeans, Skinny NYC Wash" and "Studio M Smock Top." FIG. 13A also illustrates how the "Studio M Smocked Top" is associated with an input element 226 in the form of a button that states "Buy Now." Upon clicking or selecting the "Buy Now" input element 226, a page or screen of a website 217 is displayed to consumer 235 and includes additional information about the Studio M Smocked Top, which may be added or is already added to, an electronic shopping cart. The price that is displayed within the digital receipt 223 may be the price that was previously paid, whereas the price displayed within the website 217 may be the price that was previously paid or a current price. Thus, in this example, consumer 235 was reviewing a digital receipt 223 for items purchased at MACYS and was able to submit a request to purchase the same Studio M Smock Top again through the digital receipt 223.

FIG. 13B illustrates another example of how embodiments may be implemented and illustrates a digital receipt 223 for THE CONTAINER STORE and identifies three items 221a-c: Lunus Shallow Drawer Organizers, Tribeca wastebasket and amber bottles with glass droppers. Each item 212a-c is associated with an input element 226a-c in the form of a button that states "BUY IT AGAIN" and respective prices which, as explained above, may be the current prices for those items 212 or prices previously paid that may be updated when displayed within the website 217 or at checkout.

Thus, with embodiments, a consumer 235 is able to review a digital receipt 223, and upon viewing an item 212 that consumer 235 wants to purchase again, selects or clicks the input element 226 or button to transform the digital receipt 223 into a link to a website 217 that offers the item 212 for sale and to transform review of a digital receipt 223 into an e-commerce shopping experience. Embodiments provide for item repurchase without requiring consumers 235 to remember particulars about the item 212 since these details are within the digital receipt 223, and consumer 235 is not required to try to guess the item particulars or search for the item 212 in stores or on-line.

Figure 14:
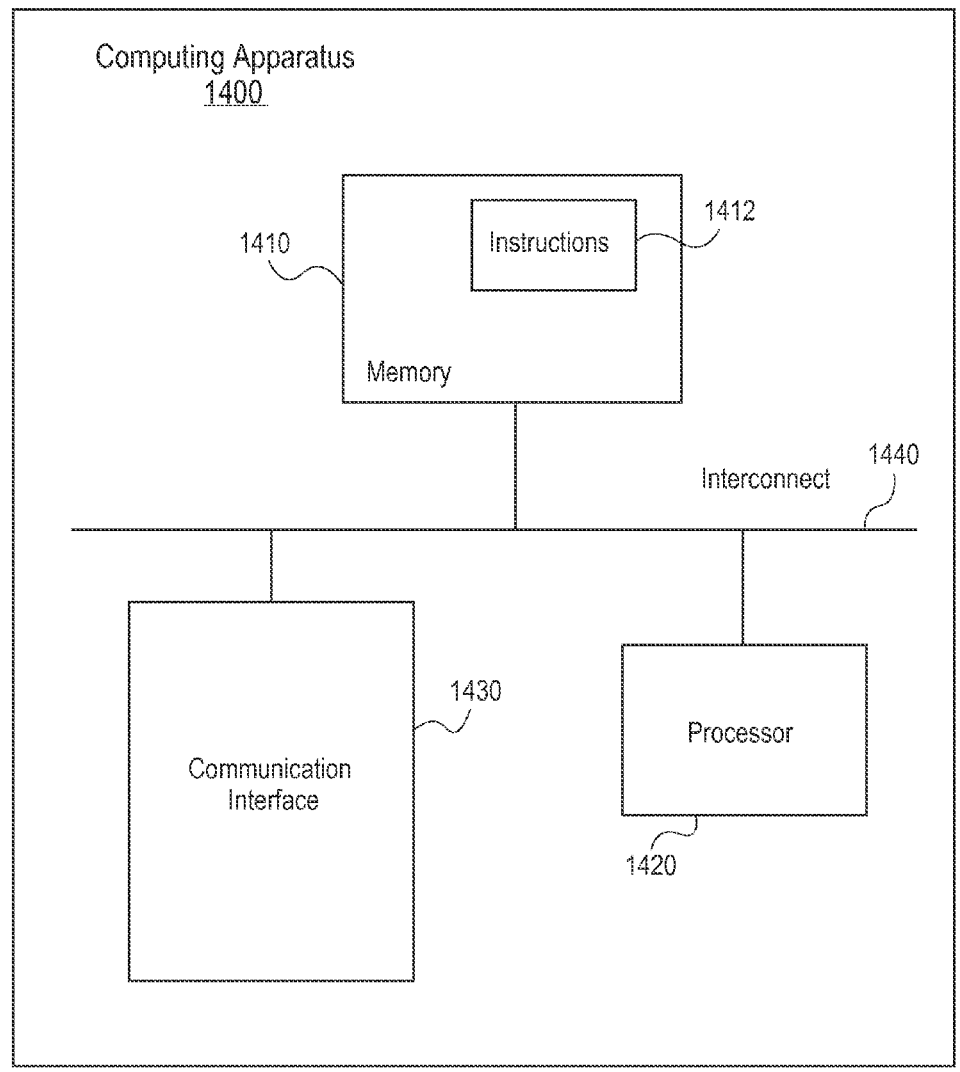
FIG. 14 is a block diagram of components of a computing apparatus or system in which various embodiments may be implemented or that may be utilized to execute embodiments.

FIG. 14 generally illustrates components of a computing device 1400 that may be utilized to execute embodiments and that includes a memory 1410, account processing program instructions 1412, a processor or controller 1420 to execute account processing program instructions 1412, a network or communications interface 1430, e.g., for communications with a network or interconnect 1440 between such components. The memory 1410 may be or include one or more of cache, RAM, ROM, SRAM, DRAM, RDRAM, EEPROM and other types of volatile or non-volatile memory capable of storing data. The processor unit 1420 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1040 may include a system bus, LDT, PCI, ISA, or other types of buses, and the communications or network interface may, for example, be an Ethernet interface, a Frame Relay interface, or other interface. The network interface 1430 may be configured to enable a system component to communicate with other system components across a network which may be a wireless or various other networks. It should be noted that one or more components of computing device 1400 may be located remotely and accessed via a network. Accordingly, the system configuration provided in FIG. 14 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1420 executes program instructions 1412 within memory 1410 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference items in the form of goods, embodiments may also involve items in the form of services or both good and services consumed by individuals and corporate and government entities.

Embodiments may involve re-purchasing or re-buying one or multiple items identified within the same or different digital receipt. For example, a digital receipt may include one item, and a consumer may request to buy that item again. As another example, a digital receipt may include multiple items, and a consumer may request to buy one or multiple items again, and the input element may be encoded such that all of the items to be purchased again are purchased from the same merchant or from different merchants.

Moreover, while certain embodiments are described with reference to a single input element being associated with an item, other embodiments may involve an item being associated with multiple input elements or buttons such that the consumer is provided with a choice regarding which merchant to shop at to purchase the item again.

Further, it will be understood that a first type of computing device (e.g., a computer) may be used to purchase an item a first time, and another type of computing device (e.g., a mobile communication device such as a Smartphone) may be used to purchase the same item a second time by selecting or clicking on input element.

While certain embodiments are described with reference to a first or prior purchase by consumer from merchant, it will be understood that item-level transaction data generated by on-line and in-store purchases may be utilized to generate digital receipts, and that subsequent purchases of the same item may also be an on-line purchase (e.g., through a website) or consumer may call or visit a merchant store once consumer becomes aware of which merchant offers the same item that is to be purchased.

Certain embodiments are described with reference to a first or prior purchase of an item as involving a transaction processing device that transmits item-level transaction data to intermediate or host computer, and subsequent purchases of the same item as involving an on-line purchase or in-store purchase. However, in other embodiments, the first or prior purchase of an item is an on-line purchase and item level receipt data can be transmitted from a transaction processing device for on-line purchases to the intermediate or host computer, and subsequent purchases of the same item may be on-line or in-store purchases.

Additionally, where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Further, the data collected by receipt program to determine which merchants offer which items and which items may be referenced by an input element can be updated, e.g., periodically. In this manner, the receipt program is working from updated data, which may have changed over time or are adaptive or dynamic due to changes in merchants who are in business, new merchants, merchant inventory, etc. such that an input element can be encoded with data and be dynamically adjusted over time based on available item and inventory data maintained in database by receipt program.

Accordingly, embodiments are intended to exemplify alternatives, modifications, and equivalents that may fall within the scope of the claims.

What is claimed is:

1. A computer-implemented method for directing a consumer to a source offering for sale a specific item previously purchased by the consumer, the method being performed by a computer and comprising the computer:
   receiving electronic receipt data generated by a transaction processing device of a merchant, the electronic receipt data identifying the specific item purchased by the consumer from the merchant;
   identifying a plurality of merchants offering the specific item for sale;
   selecting a merchant of the plurality of merchants based at least in part upon pre-determined prioritization criteria involving prior purchases by the consumer;
   encoding an input element based at least in part upon the selected merchant and the specific item; and
   generating a digital receipt, the digital receipt comprising: item-level data identifying the specific item purchased and the input element selectable by the consumer to direct the consumer from the digital receipt to the selected merchant offering the specific item for sale.

2. The method of claim 1, identifying the plurality of merchants comprising searching electronic or on-line sources of respective merchants including the specific item identified by the item-level receipt data.

3. The method of claim 2, the computing searching electronic or on-line sources periodically.

4. The method of claim 2, searching electronic or on-line sources comprising searching respective websites of respective merchants, the computer determining whether a merchant offers the specific item for sale based at least in part upon the specific item being identified within a merchant website.

5. The method of claim 1, the pre-determined prioritization criteria comprising whether the consumer purchased the specific item from the merchant in the past, wherein the merchant from which the consumer has purchased the specific item in the past has priority over other merchants to be the selected merchant.

6. The method of claim 1, the pre-determined prioritization criteria comprising the merchant from which the consumer purchased the specific item most recently, wherein the merchant from which the consumer purchased the specific item most recently has priority over other merchants to be the selected merchant.

7. The method of claim 1, the pre-determined prioritization criteria comprising a number of times the consumer purchased the specific item from each merchant, wherein the merchant from which the consumer purchased the specific item the largest number of times has priority over other merchants to be the selected merchant.

8. The method of claim 1, the pre-determined prioritization criteria comprising:
   whether the consumer purchased the specific item from the merchant in the past, wherein the merchant from which the consumer has purchased the specific item in the past has priority over other merchants to be the selected merchant;
   the merchant from which the consumer purchased the specific item most recently, wherein the merchant from which the consumer purchased the specific item most recently has priority over other merchants to be the selected merchant; and a number of times the consumer purchased the specific item from each merchant, wherein the merchant from which the consumer purchased the specific item the largest number of times has priority over other merchants to be the selected merchant.

9. The method of claim 1, further comprising the computer confirming the selected merchant has the specific item in inventory.

10. The method of claim 1, further comprising the computer updating the input element of the digital receipt.

11. The method of claim 10, the input element being updated to reflect merchant inventory or item availability.

12. The method of claim 10, the computer determining that a first merchant that was identified and data of which was encoded in the input element no longer has the specific item in inventory, the method further comprising the computer:
   identifying another merchant that has the specific item in inventory; and
   updating the input element by encoding the input element with data of the other identified merchant, the updated input element being included within the digital receipt presented to the consumer.

13. The computer-implemented method of claim 1, the input element being encoded to direct the consumer to a page of a website in which the specific item has been added to an electronic order or electronic shopping cart.

14. The computer-implemented method of claim 1, the specific item being purchased again from the identified merchant with a single click of the input element.

15. The computer-implemented method of claim 1, the digital receipt comprising respective item-level data identifying a plurality of specific items previously purchased by the consumer, wherein an input element is associated with each of the plurality of specific items.

16. The computer-implemented method of claim 1, the digital receipt comprising item-level data identifying a plurality of specific items previously purchased by the consumer, wherein at least one specific item is associated with an input element and at least one specific item is not associated with an input element.

17. The computer-implemented method of claim 14, the input element being encoded such that the consumer is directed to a merchant that is different from the merchant from which the consumer purchased the specific item and that generated the electronic receipt data.

18. A computer-implemented method for presenting a digital receipt for a specific item purchased by a consumer to the consumer to allow the consumer to repurchase the same item, the method comprising:
   a computer generating a digital receipt comprising:
      item-level data identifying the specific item purchased by the consumer;
      an input element selectable by the consumer to direct the consumer from the digital receipt to a merchant offering the specific item for sale, the input element being encoded with data of the specific item and data of a merchant selected based at least in part upon pre-determined prioritization criteria involving prior purchases by the consumer; and
   the computer providing access to the digital receipt in response to a request by a computing device of the consumer, the digital receipt being displayable on a screen of the computing device to allow the consumer to select the input element to be directed to the merchant offering the specific item for sale.

19. A computer-implemented method for presenting a digital receipt for a specific item purchased by a consumer to the consumer to allow the consumer to repurchase the same item, the method comprising:
   a computer determining that a first merchant has the specific item in inventory and offers the specific item for sale;
   the computer generating a digital receipt comprising:
      item-level data identifying the specific item that was purchased, and
      an input element selectable by the consumer to direct the consumer from the digital receipt to the first merchant;
   the computer determining that the first merchant no longer has the specific item in inventory and that a second merchant, different from the first merchant, has the specific item in inventory and offers the specific item for sale;
   the computer updating the input element to include data of the second merchant, the updated input element being included within the digital receipt presented to the consumer; and
   the computer providing access to the digital receipt including the updated input element in response to a request by a computing device of the consumer, the digital receipt being displayable on a screen of the computing device to allow the consumer to select the updated input element to be directed to the second merchant.

20. The method of claim 19, the second merchant being selected from a plurality of merchants determined to offer the specific item for sale and based at least in part upon the second merchant satisfying pre-determined prioritization criteria involving prior purchases by the consumer.

* * * * *